(12) United States Patent
Ono

(10) Patent No.: US 7,564,748 B2
(45) Date of Patent: Jul. 21, 2009

(54) OPTICAL DISK RECORDING/REPRODUCING APPARATUS

(75) Inventor: Takayuki Ono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 552 days.

(21) Appl. No.: 11/035,995

(22) Filed: Jan. 18, 2005

(65) Prior Publication Data

US 2005/0157615 A1 Jul. 21, 2005

(30) Foreign Application Priority Data

Jan. 19, 2004 (JP) ............ P.2004-010545

(51) Int. Cl.
*G11B 7/00* (2006.01)

(52) U.S. Cl. .................................. 369/44.35

(58) Field of Classification Search ............... None
See application file for complete search history.

(56) References Cited

U.S. PATENT DOCUMENTS

| 4,475,182 | A | * | 10/1984 | Hosaka | 369/44.36 |
| 4,761,692 | A | * | 8/1988 | Yoshida et al. | 386/35 |
| 4,817,073 | A | * | 3/1989 | Suzuki | 369/44.28 |
| 5,247,501 | A | * | 9/1993 | Hashimoto et al. | 369/44.11 |
| 6,167,010 | A | * | 12/2000 | Shimada et al. | 369/44.35 |
| 6,282,157 | B1 | * | 8/2001 | Kim et al. | 369/44.35 |

FOREIGN PATENT DOCUMENTS

| JP | 1-182933 | 7/1989 |
| JP | 5-73946 | 3/1993 |
| JP | 11-25474 | 1/1999 |
| JP | 2000-215469 | 8/2000 |
| JP | 2000-306252 | 11/2000 |

\* cited by examiner

*Primary Examiner*—Andrea L Wellington
*Assistant Examiner*—Peter Vincent Agustin
(74) *Attorney, Agent, or Firm*—Morgan, Lewis & Bockius LLP

(57) ABSTRACT

The gain of an amplification circuit for amplifying a tracking error signal generated from an RF signal sent from an optical pickup is adjusted according to a low-frequency component signal sent from a lowpass filter. A drive circuit drives an actuator according to a signal sent from the amplification circuit. Incidentally, in a case where a laser beam converted by an objective lens shifts from a central position of a track of an optical disk, the gain of the amplification circuit is increased according to the low-frequency component signal sent from the lowpass filter. The lens shift is corrected in such a way as to prevent a controlling force, which acts upon the actuator, from being reduced. Consequently, tracking servo can be applied in a stable state.

1 Claim, 3 Drawing Sheets

OPTICAL DISK RECORDING/REPRODUCING APPARATUS

BACKGROUND OF THE INVENTION

1. Field of the Invention

The present invention relates to an optical disk recording/reproducing apparatus for recording and reproducing information on and from an optical disk, and more particularly to a servo system for controlling the position of an objective lens in an optical pickup.

2. Description of the Related Art

Conventionally, an optical disk recording/reproducing apparatus has an objective lens for converging a laser to a track of an optical disk, and also has an optical pickup for optically performing recording/reproducing of information on an optical disk, a tracking servo system for tracking-controlling the objective lens according to a tracking error signal generated from an RF signal received from this optical pickup, and a focusing servo system for performing a focusing control operation on the objective lens according to a focusing error signal generated from an RF signal received from the optical pickup.

The tracking servo system has a tracking error detection circuit for detecting a tracking error signal generated from an RF signal received from the optical pickup, a tracking servo filter for appropriately adjusting the frequency characteristic of the detected tracking error signal, a tracking servo amplification circuit for amplifying the tracking error signal received from this tracking servo filter, and a focusing servo drive circuit for outputting a drive signal that is used for driving a tracking servo actuator for performing a tracking position control operation on the objective lens according to a signal outputted from this tracking servo amplification circuit.

The focusing servo system has a focusing error detection circuit for detecting a focusing error signal generated from an RF signal received from an optical pickup, a focusing servo filter for appropriately adjusting the frequency characteristic of the detected focusing error signal, a focusing servo amplification circuit for amplifying the focusing error signal received from this focusing servo filter, and a focusing servo drive circuit for outputting a drive signal that is used for driving a focusing servo actuator for performing a focusing position control operation on the objective lens according to a signal received from this focusing servo amplification circuit.

Meanwhile, in a case where a laser beam converged by the objective lens of the optical pickup shifts from a central position of a track of an optical disk, that is, in a case where the lens shift of the objective lens is performed, a tracking servo is applied by performing feedback control, under which a tracking servo actuator is controlled to thereby correct the lens shift of the objective lens and return the objective lens to an original position (that is, a position at which the optical pickup can irradiate laser beams from the objective lens to the center of a track), in the tracking servo system.

However, in the case where the lens shift of the objective lens occurs, the sensitivity of the tracking servo actuator is reduced according to the shift amount of the objective lens from the lens central position a, as shown in, for example, FIG. 2. This results in occurrences of problems that the controlling force of the tracking servo is lowered and that stable tracking servo cannot be applied.

Further, in a case where the laser beam converged by the objective lens of the optical pickup shifts from a focal position on a track of the optical disk, that is, in a case where the lens shift of the objective lens is performed, a focusing servo is applied by performing feed back control, under which a focusing servo actuator is controlled to thereby correct the lens shift of the objective lens and return the objective lens to an original position (that is, a focal position, at which the laser beams are converged, on the track), in the focusing servo system.

However, in the case where the lens shift of the objective lens occurs, the sensitivity of the focusing servo actuator is reduced according to the shift amount of the objective lens from the focal position c as shown in, for example, FIG. 4. This results in occurrences of problems that the controlling force of the focusing servo is lowered and that stable focusing servo cannot be applied.

Incidentally, although the prior art described in JP-A-5-73946 corrects the lens shift by adjusting only one of a tracking adjusting portion, which includes a relay lens driving coil for tracking-controlling, and a drive portion including a driving coil of a linear motor serving as a movable portion driving means thereby to set a boundary point and a gain. However, this prior art takes no measures against the reduction in the controlling force of the tracking servo in a state in which the lens shift is performed. Thus, this prior art cannot solve the aforementioned problems.

Although the prior art described in JP-A-11-25474 performs traverse control so as to reduce a lens shift amount, this prior art takes no measures against the reduction in the controlling force of the tracking servo in a sate in which the lens shift is performed. Thus, this prior art cannot solve the aforementioned problems.

SUMMARY OF THE INVENTION

The invention is accomplished to solve the aforementioned problems. An object of the invention is to provide an optical disk recording/reproducing apparatus adapted so that tracking-servo/focusing-servo can be applied in a stable state even in a case where the lens shift of an objective lens occurs.

To achieve the foregoing object, according to a first aspect of the invention, there is provided an optical disk recording/reproducing apparatus having an optical pickup that has an objective lens for converging laser beams to a track on an optical disk, and also having a tracking servo system for tracking-controlling the objective lens according to a tracking error signal generated from an RF signal sent from the optical pickup, and a focusing servo system for focusing-controlling the objective lens according to a focusing error signal generated from an RF signal sent form the optical pickup. The tracking servo system includes a tracking servo filter for appropriately adjusting a frequency characteristic of a tracking error signal generated from an RF signal sent from the optical pickup, a tracking servo lowpass filter for extracting a low-frequency component of the tracking error signal sent from the tracking servo filter, a tracking servo amplification circuit for amplifying the tracking error signal sent from the tracking servo filter and for adjusting a gain thereof according to a low-frequency component signal sent from the tracking servo lowpass filter, and a tracking servo drive circuit for outputting a drive signal that is used for performing tracking-position-control of the objective lens according to a signal sent from the tracking servo amplification circuit. In a case where a laser beam converged by the objective lens shifts from a central position of a track of the optical disk, the tracking servo system performs a control operation of increasing a gain of the tracking servo amplification circuit to thereby correct a controlling force acting upon the tracking servo actuator. The focusing servo system includes a focusing servo filter for appropriately adjusting a frequency characteristic of a focusing error signal generated from an RF signal sent from the optical pickup, a focusing servo lowpass filter for extracting a low-frequency component of the focusing error signal sent from the focusing servo filter, a focusing servo amplification circuit for amplifying the focusing error signal sent from the focusing servo filter and for adjusting a gain thereof according to a low-frequency component signal sent from the focusing servo lowpass filter, and a focusing servo drive circuit for outputting a drive signal that is used for performing focusing-position-control of the objective lens according to a signal sent from the focusing servo amplification circuit. In a case where a laser beam converged by the objective lens shifts from a focal position on a track of the optical disk, the focusing servo system performs a control operation of increasing a gain of the focusing servo amplification circuit to thereby correct a controlling force acting upon the focusing servo actuator.

In this configuration, the frequency characteristic of the tracking error signal generated from an RF signal sent from the optical pickup is appropriately adjusted. The low-frequency of the tracking error signal sent from this tracking servo filter is extracted by the tracking servo lowpass filter. The tracking error signal sent from the tracking servo filter is amplified by the tracking servo amplification circuit. The gain of the tracking servo amplification circuit is adjusted according to the low-frequency component signal sent from the tracking servo low pass filter. The tracking servo drive circuit drives the tracking servo actuator according to a signal sent from the tracking servo amplification circuit.

Incidentally, in the case where the laser beam converged by the objective lens shifts from the central position of the track of the optical disk, the gain of the tracking servo amplification circuit is increased according to the low-frequency component signal sent from the tracking servo lowpass filter to thereby correct the controlling force acting upon the tracking servo actuator in such a way as to be prevented from being reduced.

The frequency characteristic of the focusing error signal generated from an RF signal sent from the optical pickup is appropriately adjusted by the focusing servo filter. The low-frequency component of the focusing error signal sent from this focusing servo filter is extracted by the focusing servo lowpass filter. The focusing error signal outputted from the focusing servo filter is amplified by the focusing servo amplification circuit. The gain of the focusing servo amplification circuit is adjusted according to the low-frequency component signal sent from the focusing servo lowpass filter. The focusing servo drive circuit drives the focusing servo actuator according to a signal sent from the focusing servo amplification circuit.

Incidentally, in the case where the laser beam converged by the objective lens shifts from the focal position on the track of the optical disk, the gain of the focusing servo amplification circuit is increased according to the low-frequency component signal sent from the focusing servo lowpass filter to thereby correct the controlling force acting upon the focusing servo actuator in such a way as to be prevented from being reduced.

With this configuration, even when the lens shift of the objective lens occurs, reduction in the sensitivity of the tracking servo actuator and/or reduction in the sensitivity of the focusing servo actuator can be suppressed. Consequently, reduction in the controlling force acting upon the tracking servo and/or the focusing servo can be suppressed. Thus, a recording operation and/or a reproducing operation of the optical disk recording/reproducing apparatus can be stabilized. Therefore, the invention is effectively applied, needless to say, to an in-room optical disk recording/reproducing apparatus and also effectively applied especially to a vehicle-mounted optical disk recording/reproducing apparatus.

According to a second aspect of the invention, there is provided an optical disk recording/reproducing apparatus having an optical pickup that has an objective lens for converging laser beams to a track on an optical disk, and also having a tracking servo system for tracking-controlling the objective lens according to a tracking error signal generated from an RF signal sent from the optical pickup, and a focusing servo system for focusing-controlling the objective lens according to a focusing error signal generated from an RF signal sent from the optical pickup. In a case where a laser beam converged by the objective lens shifts from a central position of a track of the optical disk, the tracking servo system performs a control operation of increasing a gain of the tracking servo amplification circuit to thereby correct a controlling force acting upon the tracking servo actuator. In a case where a laser beam converged by the objective lens shifts from a focal position on a track of the optical disk, the focusing servo system performs a control operation of increasing a gain of the focusing servo amplification circuit to thereby correct a controlling force acting upon the focusing servo actuator.

In this configuration, in the case where the laser beam converged by the objective lens shifts from the central position of the track of the optical disk, the gain of the tracking servo amplification circuit is increased to thereby correct the controlling force acting upon the tracking servo actuator. Further, in the case where the laser beam converged by the objective lens shifts from the focal position on the track of the optical disk, the gain of the focusing servo amplification circuit is increased to thereby correct the controlling force acting upon the focusing servo actuator.

With this configuration, even when the lens shift of the objective lens occurs, reduction in the sensitivity of the tracking servo actuator and/or reduction in the sensitivity of the focusing servo actuator can be suppressed. Consequently, redaction in the controlling force acting upon the tracking servo and/or the focusing servo can be suppressed. Thus, a recording operation and/or a reproducing operation of the optical disk recording/reproducing apparatus can be stabilized. Therefore, the invention is effectively applied, needless to say, to an in-room optical disk recording/reproducing apparatus and also effectively applied especially to a vehicle-mounted optical disk recording/reproducing apparatus.

According to an embodiment of the apparatus according to the second aspect of the invention, the tracking servo system includes a tracking servo filter for appropriately adjusting a frequency characteristic of a tracking error signal generated from an RF signal sent from the optical pickup, a tracking servo lowpass filter for extracting a low-frequency component of the tracking error signal sent from the tracking servo filter, a tracking servo amplification circuit for amplifying the tracking error signal sent from the tracking servo filter and for adjusting a gain thereof according to a low-frequency component signal sent from the tracking servo lowpass filter, and a tracking servo drive circuit for outputting a drive signal that is used for performing tracking-position-control of the objective lens according to a signal sent from the tracking servo amplification circuit. The focusing servo system includes a focusing servo filter for appropriately adjusting a frequency characteristic of a focusing error signal generated from an RF signal sent from the optical pickup, a focusing servo lowpass filter for extracting a low-frequency component of the focusing error signal sent from the focusing servo filter, a focusing servo amplification circuit for amplifying the focusing error signal sent from the focusing servo filter and for adjusting a gain thereof according to a low-frequency component signal sent from the focusing servo lowpass filter, and a focusing servo drive circuit for outputting a drive signal that is used for performing focusing-position-control of the objective lens according to a signal sent from the focusing servo amplification circuit. Thus, in the case where the laser beam converged by the objective lens shifts from the central position of the track of the optical disk, the apparatus is enabled to perform a control operation of increasing the gain of the tracking servo amplification circuit to thereby correct the controlling force acting upon the tracking servo actuator. Also, in the case where the laser beam converged by the objective lens shifts from the focal position on the track of the optical disk, the apparatus is enabled to perform a control operation of increasing the gain of the tracking servo amplification circuit to thereby correct the controlling force acting upon the focusing servo actuator.

As described above, according to the invention, the tracking servo system has the tracking servo filter for appropriately adjusting the frequency characteristic of a tracking error signal generated from an RF signal sent from the optical pickup, the tracking servo lowpass filter for extracting a low-frequency component of the tracking error signal sent from the tracking servo filter, the tracking servo amplification circuit for amplifying the tracking error signal sent from the tracking servo filter and for adjusting a gain thereof according to a low-frequency component signal sent from the tracking servo lowpass filter, and the tracking servo drive circuit for outputting a drive signal that is used for performing tracking-position-control of the objective lens according to a signal sent from the tracking servo amplification circuit. In the case where the laser beam converged by the objective lens shifts from the central position of the track of the optical disk, the tracking servo system performs a control operation of increasing the gain of the tracking servo amplification circuit thereby to correct the controlling force acting upon the tracking servo actuator. The focusing servo system has the focusing servo filter for appropriately adjusting the frequency characteristic of a focusing error signal generated from an RF signal sent from the optical pickup, the focusing servo lowpass filter for extracting a low-frequency component of the focusing error signal sent from the focusing servo filter, the focusing servo amplification circuit for amplifying the focusing error signal sent from the focusing servo filter and for adjusting a gain thereof according to a low-frequency component signal sent from the focusing servo lowpass filter, and the focusing servo drive circuit for outputting a drive signal that is used for performing focusing-position-control of the objective lens according to a signal sent from the focusing servo amplification circuit. In the case where the laser beam converged by the objective lens shifts from the focal position on the track of the optical disk, the tracking servo system performs a control operation of increasing the gain of the focusing servo amplification circuit thereby to correct the controlling force acting upon the focusing servo actuator. Thus, even when the lens shift of the objective lens occurs, reduction in the sensitivity of the tracking servo actuator and/or reduction in the sensitivity of the focusing servo actuator can be suppressed. Consequently, reduction in the controlling force acting upon the tracking servo and/or the focusing servo can be suppressed. Thus, a recording operation and/or a reproducing operation of the optical disk recording/reproducing apparatus can be stabilized. Therefore, the invention is effectively applied, needless to say, to an in-room optical disk recording/reproducing apparatus and also effectively applied especially to a vehicle-mounted optical disk recording/reproducing apparatus.

Further, according to the invention, in the case where the laser beam converged by the objective lens shifts from the central position of the track of the optical disk, the tracking servo system performs a control operation of increasing the gain of the tracking servo amplification circuit thereby to correct the controlling force acting upon the tracking servo actuator. In the case where the laser beam converged by the objective lens shifts from the focal position on the track of the optical disk, the tracking servo system performs a control operation of increasing the gain of the focusing servo amplification circuit thereby to correct the controlling force acting upon the focusing servo actuator. Thus, even when the lens shift of the objective lens occurs, reduction in the sensitivity of the tracking servo actuator and/or reduction in the sensitivity of the focusing servo actuator can be suppressed. Consequently, reduction in the controlling force acting upon the tracking servo and/or the focusing servo can be suppressed. Thus, a recording operation and/or a reproducing operation of the optical disk recording/reproducing apparatus can be stabilized. Therefore, the invention is effectively applied, needless to say, to an in-room optical disk recording/reproducing apparatus and also effectively applied especially to a vehicle-mounted optical disk recording/reproducing apparatus.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
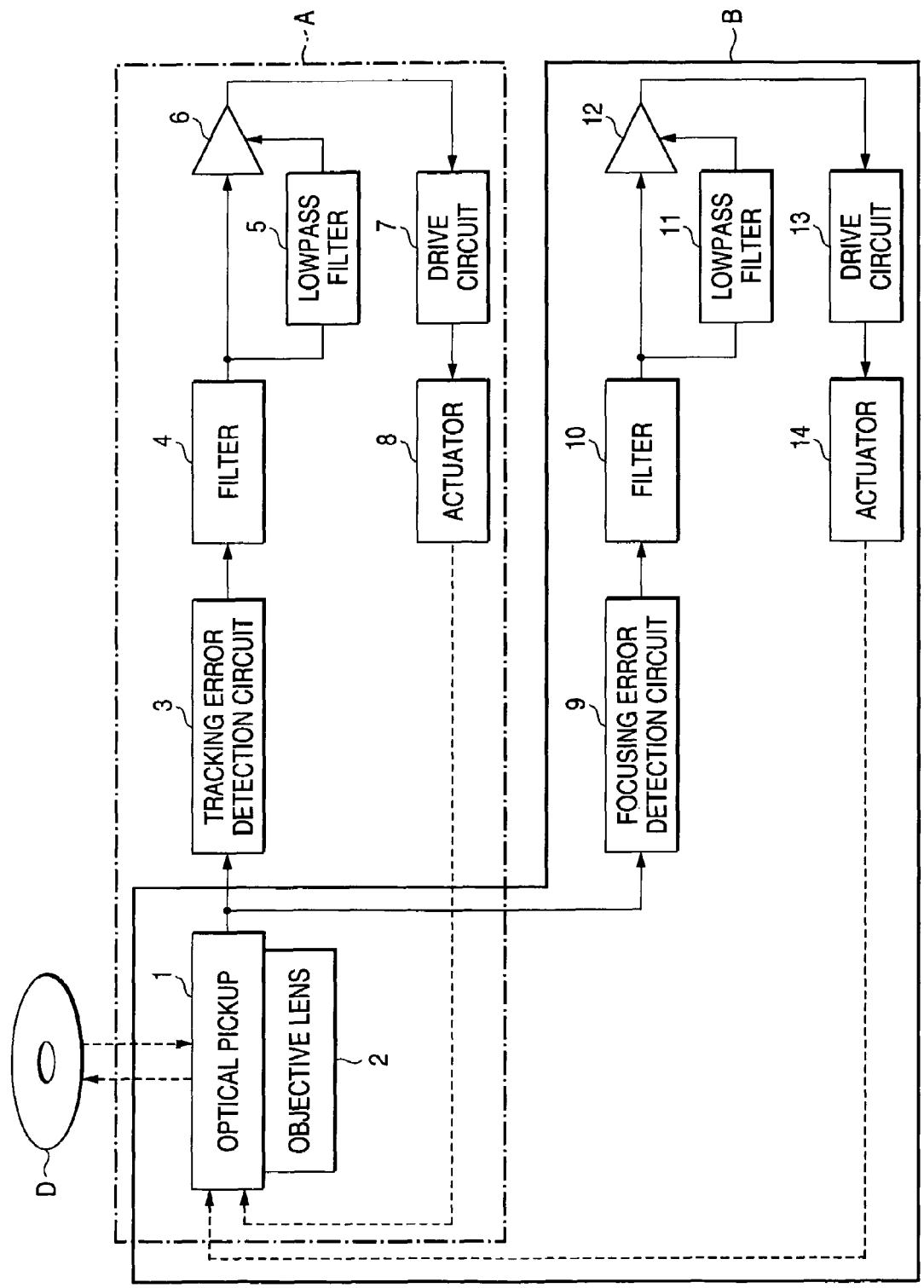
FIG. 1 is a block diagram illustrating the configuration of each of a tracking servo system and a focusing servo system of an optical disk recording/reproducing apparatus according to an embodiment of the invention.

Hereinafter, an embodiment of the invention is described by referring to the accompanying drawings. FIG. 1 is a block diagram showing the configuration of each of a tracking servo system and a focusing servo system of an optical disk recording/reproducing apparatus according to the embodiment of the invention.

This optical disk recording/reproducing apparatus has an objective lens 2 for converging a laser to a track of an optical disk D, and also has an optical pickup 1 for optically performing recording/reproducing of information on the optical disk D, a tracking servo system A for tracking-controlling the objective lens 2 according to a tracking error signal generated from an RF signal received from this optical pickup 1, and a focusing servo system B for performing a focusing control operation on the objective lens 2 according to a focusing error signal generated from an RF signal received from the optical pickup 1.

The tracking servo system A has a tracking error detection circuit 3 for detecting a tracking error signal generated from an RF signal received from the optical pickup 1, a tracking servo filter 4 for appropriately adjusting the frequency characteristic of the detected tracking error signal, a tracking servo lowpass filter 5 for extracting a low-frequency component (DC component) of a tracking error signal sent from this tracking servo filter 4, a tracking servo amplification circuit 6 for amplifying the tracking error signal received from the tracking servo filter 4 and for adjusting a gain thereof according to a low-frequency component signal sent from the tracking servo lowpass filter 5, and a tracking servo drive circuit 7 for outputting a drive signal that is used for driving a tracking servo actuator 8 for performing a tracking position control operation on the objective lens 2 according to a signal outputted from this tracking servo amplification circuit 6.

The focusing servo system B has a focusing error detection circuit 9 for detecting a focusing error signal generated from an RF signal received from the optical pickup 1, a focusing servo filter 10 for appropriately adjusting the frequency characteristic of the detected focusing error signal, a tracking servo lowpass filter 11 for extracting a low-frequency component (DC component) of a focusing error signal sent from this focusing servo filter 10, a focusing servo amplification circuit 12 for amplifying the focusing error signal received from this focusing servo filter 10 and for adjusting a gain thereof according to the low-frequency component signal received from the focusing servo lowpass filter 11, and a focusing servo drive circuit 13 for outputting a drive signal that is used for driving a focusing servo actuator 14 for performing a focusing position control operation on the objective lens 2 according to a signal received from this focusing servo amplification circuit.

Figure 2:
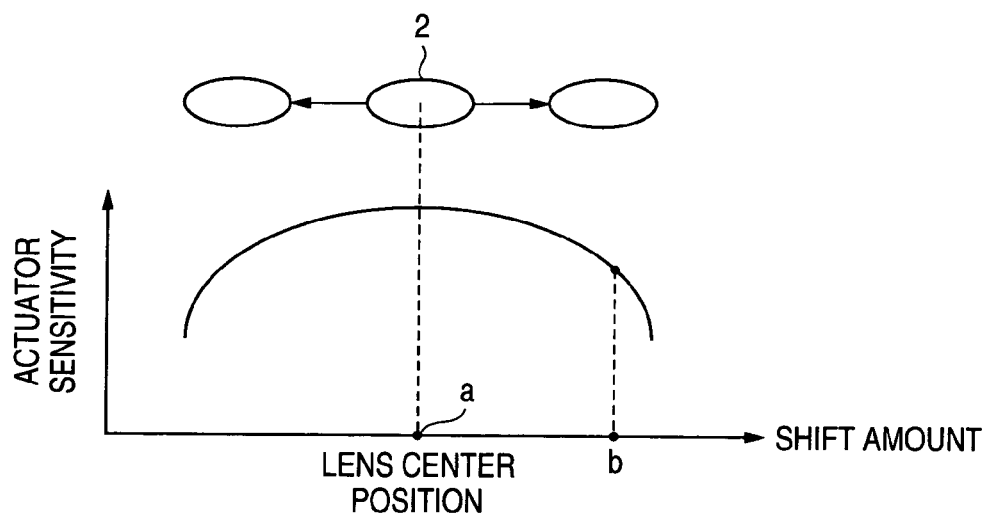
FIG. 2 is a graph illustrating the sensitivity of a tracking servo actuator versus a lens shift amount that is not corrected in the tracking servo system.
Figure 3:
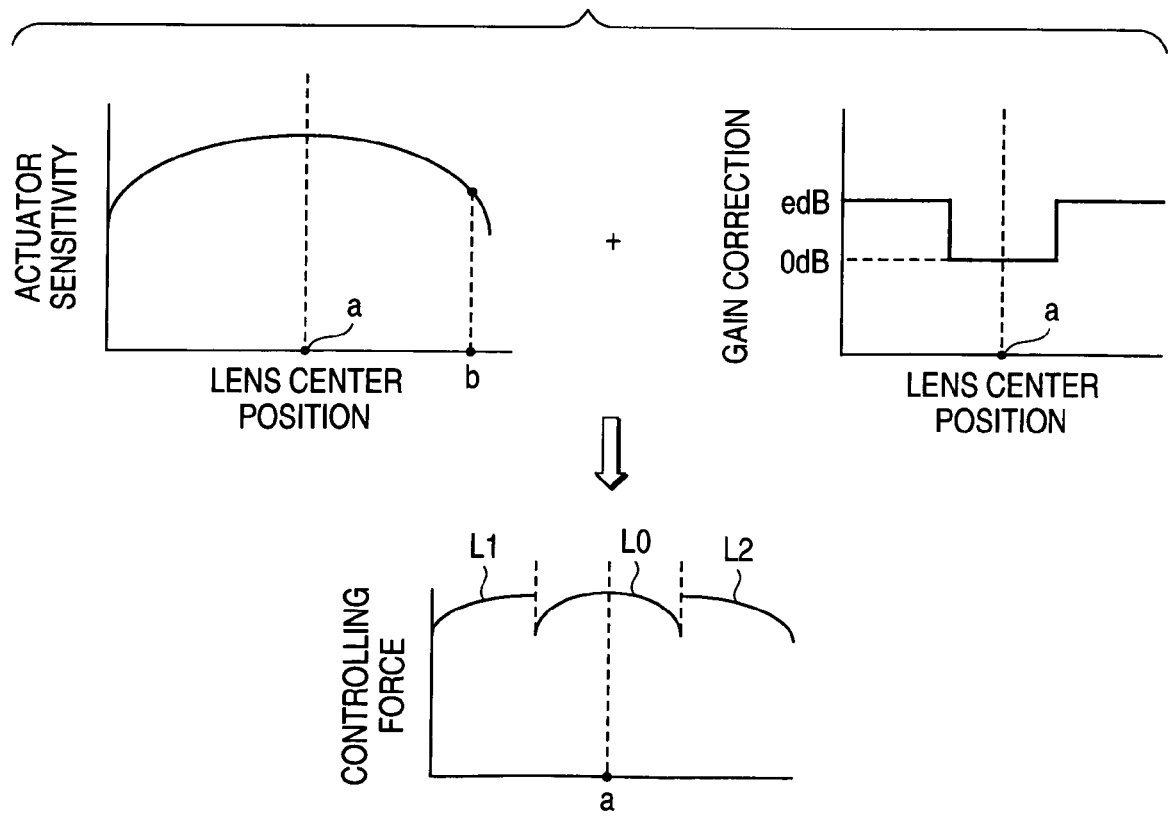
FIG. 3 is an explanatory diagram illustrating the controlling force, which acts upon the tracking servo actuator, versus the lens shift amount in the tracking servo system.

FIG. 2 is a graph illustrating the sensitivity of the tracking servo actuator 8 versus a lens shift amount that is not corrected in the tracking servo system A. FIG. 3 is an explanatory diagram illustrating the controlling force, which acts upon the tracking servo actuator 8, versus the lens shift amount in the tracking servo system A.

An operation of the tracking servo system A shown in FIG. 1 is described hereinbelow by referring to FIGS. 2 and 3. In this optical disk recording/reproducing apparatus, an optical disk D, such as a DVD (Digital Versatile Disk), is inserted. When the reproduction of information is started, a tracking error signal generated from an RF signal sent from the optical pickup 1 is detected by the tracking error detection circuit 3. Thereafter, the frequency characteristic of the tracking error signal is appropriately adjusted by the tracking servo filter 4. A low-frequency component of the tracking error signal sent from this tracking servo filter 4 is extracted by the tracking servo lowpass filter 4.

The tracking error signal sent from the tracking servo filter 4 is amplified by the tracking servo amplification circuit 6. The gain of the tracking servo amplification circuit 6 is adjusted according to a low-frequency component signal sent from the tracking servo lowpass filter 5. The tracking servo drive circuit 7 drives the tracking servo actuator 8 according to a signal sent from the tracking servo amplification circuit 6. Consequently, the objective lens 2 performs a follow-up movement so that the laser beam converged by this objective lens 2 irradiates the center of a track of the optical disk D.

Then, in a case where the laser beam converged by the objective lens 2 shifts from the center position of a track of the optical disk D, the gain of the tracking servo amplification circuit 6 is increased according to the low-frequency component signal, which is sent from the tracking servo low pass filter 5, to thereby correct the controlling force, which acts upon the tracking servo actuator 8, in such a way as to be prevented from being reduced. Incidentally, such a correction can similarly be performed in a track-on mode after the seeking of information recorded on the optical disk D. Additionally, a similar correction can be performed even during the recording of information on the optical disk D.

For example, in a case where the objective lens 2 shifts from a lens center position a to a position b (for instance, rightwardly shifts from the central position of a track of the optical disk D) as shown in FIGS. 2 and 3, the sensitivity of the tracking servo actuator 8 is reduced. However, for example, as illustrated in FIG. 3, a correction to the gain of the tracking servo amplification circuit 6 is increased from 0 dB to e dB according to the low-frequency component signal sent from the tracking servo lowpass filter 5. Consequently, the controlling force acting upon the tracking servo actuator 8 changes, as indicated by line L2.

Further, in FIG. 3, line L1 represents a controlling force corrected by increasing a correction to the gain of the tracking servo amplification circuit 6 to e dB in a case where the objective lens 2 is, for example, leftwardly shifted from the central position of a track of the optical disk D. Line L0 represents a controlling force in a case where a correction to the gain of the tracking servo amplification circuit 6 is 0 dB and where the objective lens 2 is placed at or near to the central position of a track of the optical disk D.

Incidentally, for simplification of description, in the case of this tracking servo system A, the correction to the gain of the tracking servo amplification circuit 6 is assumed to be increased from 0 dB to e dB at one time. The tracking servo system A according to the invention is not limited thereto. The correction to the gain of the tracking servo amplification circuit 6 may be increased in stages or linearly.

This tracking servo system A can cover reduction in the controlling force acting upon the tracking servo actuator 8, which is caused when the objective lens 2 shifts, by increasing the gain of the tracking servo amplification circuit 6 by that much.

Figure 4:
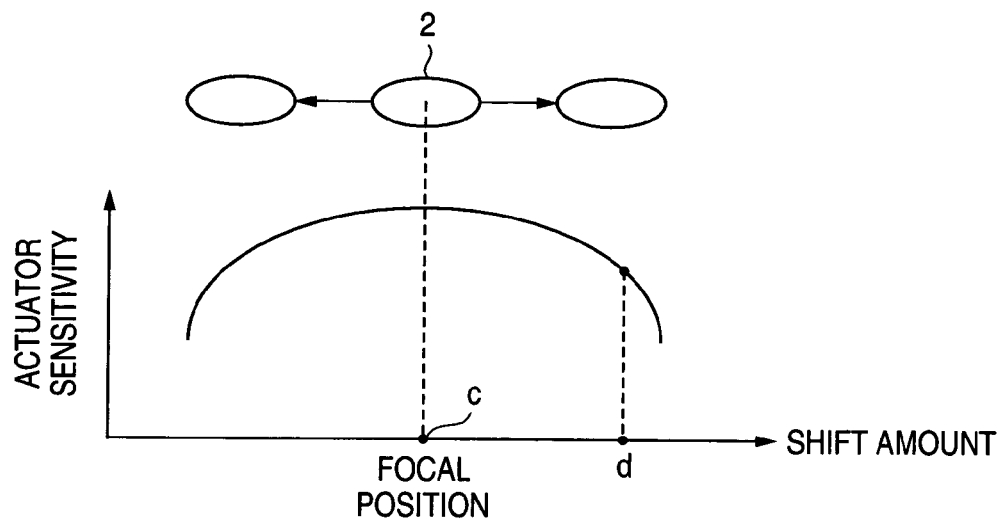
FIG. 4 is a graph illustrating the sensitivity of a focusing servo actuator versus a lens shift amount that is not corrected in the focusing servo system.
Figure 5:
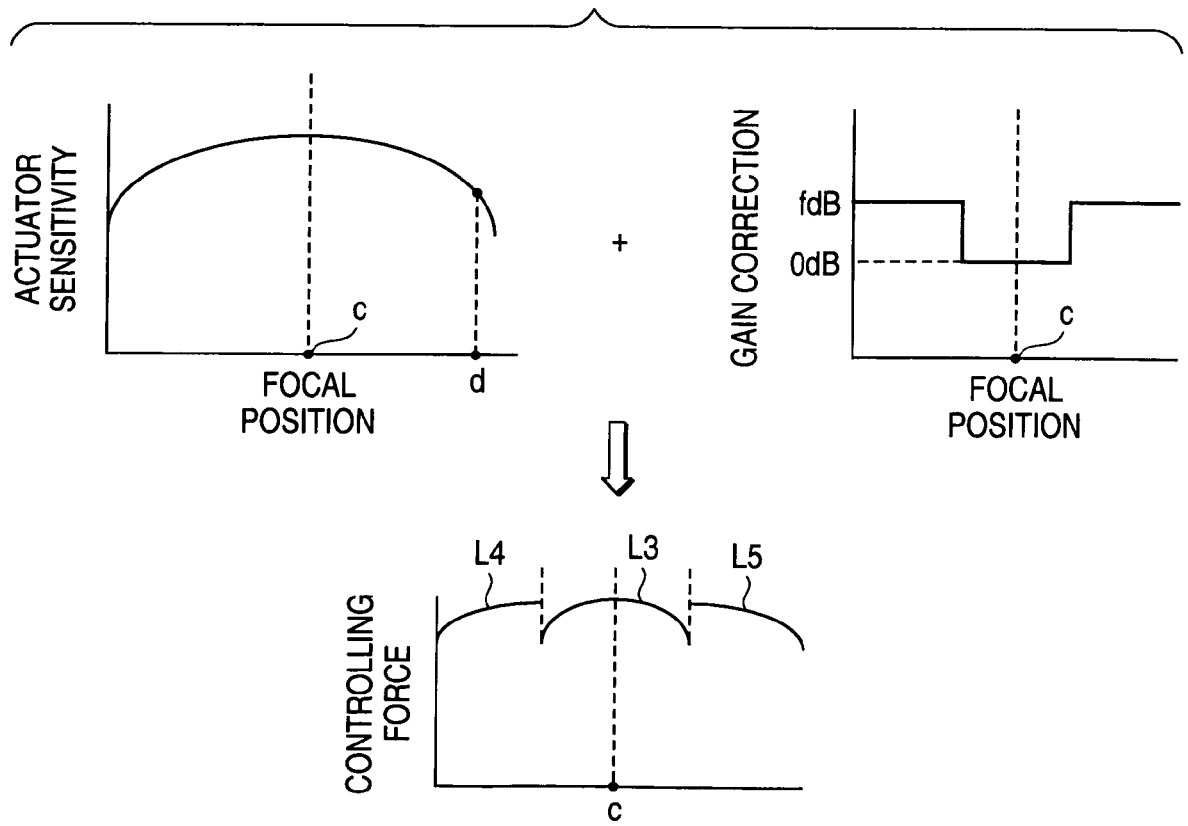
FIG. 5 is an explanatory diagram illustrating the controlling force, which acts upon the focusing servo actuator, versus the lens shift amount in the focusing servo system.

FIG. 4 is a graph illustrating the sensitivity of a focusing servo actuator 14 versus a lens shift amount that is not corrected in the focusing servo system B. FIG. 5 is an explanatory diagram illustrating the controlling force, which acts upon the focusing servo actuator 14, versus the lens shift amount in the focusing servo system B.

An operation of the focusing servo system B shown in FIG. 1 is described hereinbelow by referring to FIGS. 4 and 5. In this optical disk recording/reproducing apparatus, an optical disk D is inserted when the reproduction of information is started, a focusing error signal generated from an RF signal sent from the optical pickup 1 is detected by the focusing error detection circuit 9. Thereafter, the frequency characteristic of the tracking error signal is appropriately adjusted by the focusing servo filter 10. A low-frequency component of the focusing error signal sent from this focusing servo filter 10 is extracted by the focusing servo lowpass filter 11.

The focusing error signal sent from the focusing servo filter 10 is amplified by the focusing servo amplification circuit 12. The gain of the focusing servo amplification circuit 12 is adjusted according to a low-frequency component signal sent from the focusing servo lowpass filter 11. The focusing servo drive circuit 13 drives the focusing servo actuator 14 according to a signal sent from the focusing servo amplification circuit 13. Consequently, the objective lens 2 performs a follow-up movement so that the laser beam converged by this objective lens 2 irradiates the focal point on a track of the optical disk D.

Then, in a case where the laser beam converged by the objective lens 2 shifts from the focal point thereof for the track of the optical disk D, the gain of the focusing servo amplification circuit 13 is increased according to the low-frequency component signal, which is sent from the focusing servo lowpass filter 11, to thereby correct the controlling force, which acts upon the focusing servo actuator 14, in such a way as to be prevented from being reduced. Such a correction can similarly be performed in a track-on mode after the seeking of information recorded on the optical disk D. Additionally, a similar correction can be performed even during the recording of information on the optical disk D.

For example, in a case where the objective lens 2 shifts from a focal position c to a position d (for instance, rightwardly shifts from the focal position on a track of the optical disk D) as shown in FIGS. 4 and 5, the sensitivity of the focusing servo actuator 14 is reduced. However, for example, as illustrated in FIG. 5, a correction to the gain of the focusing servo amplification circuit 13 is increased from 0 dB to f dB according to the low-frequency component signal sent from the focusing servo lowpass filter 11. Consequently, the controlling force acting upon the focusing servo actuator 14 changes, as indicated by line L5.

Further, in FIG. 5, line L4 represents a controlling force corrected by increasing a correction to the gain of the focusing servo amplification circuit 12 to f dB in a case where the objective lens 2 is, for example, leftwardly shifts from the focal position on a track of the optical disk D. Line L3 represents a controlling force in a case where a correction to the gain of the focusing servo amplification circuit 13 is 0 dB and where the objective lens 2 is placed at or near to the focal position on the track of the optical disk D.

Incidentally, for simplification of description, in the case of this focusing servo system B, the correction to the gain of the focusing servo amplification circuit 13 is assumed to be increased from 0 dB to f dB at one time. The focusing servo system B according to the invention is not limited thereto. The correction to the gain of the focusing servo amplification circuit 13 may be increased in stages or linearly.

This focusing servo system B can cover reduction in the controlling force acting upon the focusing servo actuator 14, which is caused when the objective lens 2 shifts, by increasing the gain of the focusing servo amplification circuit 12 by that much.

As described above, according to this embodiment, even when the lens shift of the objective lens 2 occurs, reduction in the sensitivity of the tracking servo actuator 8 and/or reduction in the sensitivity of the focusing servo actuator 14 can be suppressed. Consequently, reduction in the controlling force acting upon the tracking servo and/or the focusing servo can be suppressed. Thus, a recording operation and/or a reproducing operation of the optical disk recording/reproducing apparatus can be stabilized. Therefore, the invention is effectively applied, needless to say, to an in-room optical disk recording/reproducing apparatus and also effectively applied especially to a vehicle-mounted optical disk recording/reproducing apparatus.

What is claimed is:

1. An optical disk recording/reproducing apparatus comprising:
   an optical pickup that has an objective lens for converging laser beams to a track on an optical disk;
   a tracking servo system for tracking-controlling the objective lens according to a tracking error signal generated from an RF signal sent from the optical pickup; and
   a focusing servo system for focusing-controlling the objective lens according to a focusing error signal generated from an RF signal sent from the optical pickup, wherein:
   the tracking servo system includes:
      a tracking servo filter for appropriately adjusting a frequency characteristic of a tracking error signal generated from an RF signal sent from the optical pickup;
      a tracking servo lowpass filter for extracting a low-frequency component of the tracking error signal sent from the tracking servo filter;
      a tracking servo amplification circuit for amplifying the tracking error signal directly sent from the tracking servo filter and for adjusting a gain thereof according to a low-frequency component signal directly sent from the tracking servo lowpass filter; and
      a tracking servo drive circuit for outputting a drive signal that is used for performing tracking-position-control of the objective lens according to a signal sent from the tracking servo amplification circuit;
   in a case where a laser beam converged by the objective lens shifts from a central position of a track of the optical disk, the tracking servo system performs a control operation of increasing a gain of the tracking servo amplification circuit to thereby correct a controlling force acting upon a tracking servo actuator;
   the focusing servo system includes:
   a focusing servo filter for appropriately adjusting a frequency characteristic of a focusing error signal generated from an RF signal sent from the optical pickup;
   a focusing servo lowpass filter for extracting a low-frequency component of the focusing error signal sent from the focusing servo filter;
   a focusing servo amplification circuit for amplifying the focusing error signal directly sent from the focusing servo filter and for adjusting a gain thereof according to a low-frequency component signal directly sent from the focusing servo lowpass filter; and
   a focusing servo drive circuit for outputting a drive signal that is used for performing focusing-position-control of the objective lens according to a signal sent from the focusing servo amplification circuit; and
   in a case where a laser beam converged by the objective lens shifts from a focal position on a track of the optical disk, the focusing servo system performs a control operation of increasing a gain of the focusing servo amplification circuit to thereby correct a controlling force acting upon a focusing servo actuator.

* * * * *